United States Patent [19]
Takenaka

[11] Patent Number: 5,853,358
[45] Date of Patent: Dec. 29, 1998

[54] METHOD AND MACHINE TOOL FOR MOUNTING AND DISMOUNTING BLIND COVER

[75] Inventor: Koji Takenaka, Niwa-gun, Japan

[73] Assignee: Okuma Corporation, Nagoya, Japan

[21] Appl. No.: 823,204

[22] Filed: Mar. 24, 1997

[30] Foreign Application Priority Data

Mar. 26, 1996 [JP] Japan ..................... 8-097526

[51] Int. Cl.⁶ .................................................. B73Q 3/157
[52] U.S. Cl. ..................................... 483/1; 483/3; 483/31
[58] Field of Search ............................ 483/1, 3, 7, 31, 483/2; 409/135, 231, 134

[56] References Cited

U.S. PATENT DOCUMENTS

| | | | |
|---|---|---|---|
| 4,356,621 | 11/1982 | Tomita et al. | 483/7 |
| 4,939,834 | 7/1990 | Kawasaki et al. | 483/3 |
| 5,150,994 | 9/1992 | Hsu | 409/231 |

FOREIGN PATENT DOCUMENTS

| | | |
|---|---|---|
| Y2-59-43072 | 12/1984 | Japan . |
| A-60-34243 | 2/1985 | Japan . |
| Y2-61-28677 | 8/1986 | Japan . |
| B2-7-63914 | 7/1995 | Japan . |

*Primary Examiner*—William R. Briggs
*Attorney, Agent, or Firm*—Oliff & Berridge, PLC

[57] ABSTRACT

A method and an apparatus for mounting and dismounting a blind cover, which is used for protecting an exposed surface, from cutting fluid and chips. The blind cover is held and carried by a blind cover carrier having a shank mountable into a main spindle and a pot of a tool magazine, and a flange provided with a gripping groove to be gripped by a tool changing arm. The blind cover for protecting the exposed surface of the coupling is held by openable engaging pawls provided on the blind cover carrier. The blind cover carrier holding the blind cover is carried and mounted to the main spindle in the same way as the tool and the attachment. The blind cover and the coupling are provided with respective engaging pawls. The engaging and disengaging operation of the respective engaging pawls and the mounting and dismounting operation of the blind cover to the exposed surface of the coupling are executed by a swivel indexing function of the main spindle.

8 Claims, 10 Drawing Sheets

METHOD AND MACHINE TOOL FOR MOUNTING AND DISMOUNTING BLIND COVER

BACKGROUND OF THE INVENTION

1. Field of the Invention

The present invention relates to a machine tool provided with an automatic tool changing function and an attachment which is capable of mounting a tool. More particularly, the present invention relates to a method for mounting and dismounting a blind cover for protecting a fixing mechanism of the attachment from cutting fluid and chips, and a mechanism for mounting and dismounting the blind cover.

2. Description of the Prior Arts

In machine tools for cutting or drilling a workpiece, there are two types of tool holding systems. One is a type for directly mounting a tool on a main spindle.

The other is a type for mounting a large size tool via an attachment which is capable of being fixed to a spindle head. Usually, an attachment type machine tool is able to directly mount a tool on a spindle, and has improved flexibility.

When the attachment is mounted on the machine tool, it is necessary to rigidly fix the attachment to the spindle head. For this reason, a clamping mechanism is formed, for example, at a lower end face of the spindle head without a cover. When the attachment is used, the attachment is connected and fixed to the spindle head by the clamping mechanism. When the attachment is not used in machining, for example, in the case where a tool is directly connected to the main spindle, the clamping mechanism is exposed at the position facing the machining surface. If cutting fluid and chips splashed during machining get into the clamping mechanism through the exposed part, mounting of the attachment is impaired. For this reason, a blind cover is provided for covering the exposed part of the clamping mechanism.

As mounting equipment of a blind cover of machine tools, for example, Japanese Utility Model Publication No. Sho 59-43072 is known. This equipment is provided with a clamping mechanism 102 for mounting an attachment to an outer part of the bottom end face of a spindle head 101, as shown in FIG. 1. An angular indexing plate 104 to be engaged with an indexing plate of the attachment is provided at a lower part of the spindle head 101. A blind cover 106 is mounted for protecting the angular indexing plate 104. The blind cover 106 has a saucerlike shape and a central hole, through which a main spindle 103 passes. An engaging part 108 is formed on the outer periphery of the blind cover 106 so as to engage with a clamping mechanism 102.

The blind cover 106 is held and carried by an attachment carrying device 110, as shown in FIG. 2. The blind cover 106 can be vertically moved and rotated about a vertical axis by means of the attachment carrying device 110. The attachment carrying device 110 comprises a carriage 113 which is arranged so as to move rightward and leftward along an arm 112 projecting from a base 111 toward the spindle head 101, a supporting frame 114 which is arranged on the carriage 113 so as to move vertically and rotate about a vertical axis, and a containing stand 115 which is arranged on the base 111, and contains the blind cover 106 and an attachment 116.

In order to mount the blind cover 106, the supporting frame 114 supporting the blind cover 106 is carried under the main spindle 103 by the carriage 113. The supporting frame. 114 is lifted and at the same time, the blind cover 106 is rotated by 450 and mounted so as to cover the spindle head side indexing plate 104 to be engaged with the attachment 116.

The equipment of Japanese Patent Publication No. Hei 7-63914 is shown in FIG. 3. The right half of FIG. 3 shows the circumstances of mounting an attachment, and the left half shows the circumstances of mounting a blind cover 124. A ring gear 123 to be engaged with a ring gear 122 provided on a large diameter attachment 128 is arranged at the lower end of a main spindle 121. In order to protect this ring gear 123 from cutting fluid and chips, a blind cover 124 is removably mounted on a cover hole of a spindle head. The blind cover 124 is held by engaging a holding pin 126, which is enforced to move toward the main spindle axis by a spring 125 provided at the lower end of the spindle head, with an annular V-shape groove formed on the outer periphery of the blind cover 124 when the blind cover 124 is mounted.

An attachment gripping part 127A and a blind cover gripping groove 127B are provided on a gripping pawl 127 of a tool changing arm. The attachment 128 is gripped by the attachment gripping part 127A. The blind cover 124 is gripped by engaging an annular projection 124A provided on the outer periphery of the blind cover 124 with the blind cover gripping groove 127B. Consequently, the changing operations of the blind cover 124 and the attachment 128 can be performed by gripping both of them through the same action. The removed blind cover 124 is held with an advance-and-retreatable holding device.

Increase of additional mechanisms for handling, mounting, and fixing the blind cover is not favorable for miniaturization of equipment in the present compactness-oriented tendency of the latest machine tools. In addition, it is required to simplify the structure of the equipment using the same mechanism for performing similar mounting operations such as mounting of blind covers, tools, and attachments.

SUMMARY OF THE INVENTION

The present invention solves such problems. An object of the present invention is to provide a method for mounting and dismounting a blind cover using a simple mechanism which can handle a blind cover like a tool and an attachment, and a machine tool provided with a mechanism for mounting and dismounting the blind cover.

According to the construction of the present invention, the present invention is a method for mounting and dismounting a blind cover for protecting a fixing mechanism in a machine tool provided with the fixing mechanism for supplying an attachment, which is capable of mounting and dismounting a tool, to the spindle head and for positioning and fixing the attachment using a swivel indexing mechanism.

This method comprises a step of supplying the blind cover for covering an exposed part of the fixing mechanism with a tool changing arm capable of carrying and changing a tool and an attachment when the fixing mechanism is not used, and a step of fixing the blind cover to the spindle head after adjusting the relative angular position between the blind cover and the fixing mechanism using the swivel indexing mechanism of the attachment.

According to another construction of the present invention, the fixing step of the blind cover is characterized by engaging the blind cover with the fixing mechanism by turning engaging pawls formed on both of them.

According to a third construction of the present invention, a machine tool capable of mounting a tool on a main spindle and fixing an attachment, which is capable of mounting and dismounting a tool, to a spindle head comprises a blind cover which is attached to an exposed part of a fixing mechanism for positioning and fixing the attachment for protecting the exposed part, a carrier which carries the blind cover moving between a containing position and a mounting position of the blind cover, and a tool changing arm which selectively grips the carrier, the tool, and the attachment, and reciprocates between the containing position and the mounting position.

Because the blind cover can be mounted and dismounted in the same way as the tool and the attachment using the same mechanism, miniaturization of machine tools is possible without making the equipment complex.

According to a fourth construction of the present invention, the fixing mechanism is provided with a plurality of engaging pawls, and the blind cover is also provided with a plurality of engaging pawls. The construction is characterized by engaging the engaging pawls of the fixing mechanism with the engaging pawls of the blind cover by swiveling the fixing mechanism.

According to this construction, the blind cover can be fixed merely by swiveling the fixing mechanism.

According to a fifth construction of the present invention, there is an enforcing means which maintains the engagement of both of the pawls when the engaging pawls of the fixing mechanism engage with the engaging pawls of the blind cover, and also ejects the blind cover from the mounting position when the engagement is released.

According to this construction, fixing and dismounting of the blind cover can be smoothly performed by a simple construction.

According to a sixth construction of the present invention, it is possible to contain the carrier, the tool, and the attachment in the same tool magazine because they all have shanks with the same size taper.

According to this construction, because the storing of the blind cover can be done in the same way as the tool and the attachment, it is not necessary to prepare a special space for storing the blind cover, and miniaturization of machine tools can be achieved.

According to a seventh construction of the present invention, the carrer has a gripping groove to be gripped by the tool changing arm and a flange on which a keyway is cut for inserting a key for adjusting the relative angular position between the carrier and the main spindle.

According to this construction, the carrier of the blind cover can be steadily held and smoothly carried in the same way as the tool and the attachment.

According to a eighth construction of the present invention, the flange comprises a positioning member for determining the placement position of the blind cover and an openable holding mechanism for holding the blind cover.

According to this construction, because the blind cover is supplied to the spindle head in the same condition all the time without causing any positional shift during the carrying and storing of the blind cover, the blind cover can be smoothly and accurately mounted.

DESCRIPTION OF THE PREFERRED EMBODIMENT

A preferred embodiment of the present invention will now be described with reference to the accompanying drawings.

Figure 1:
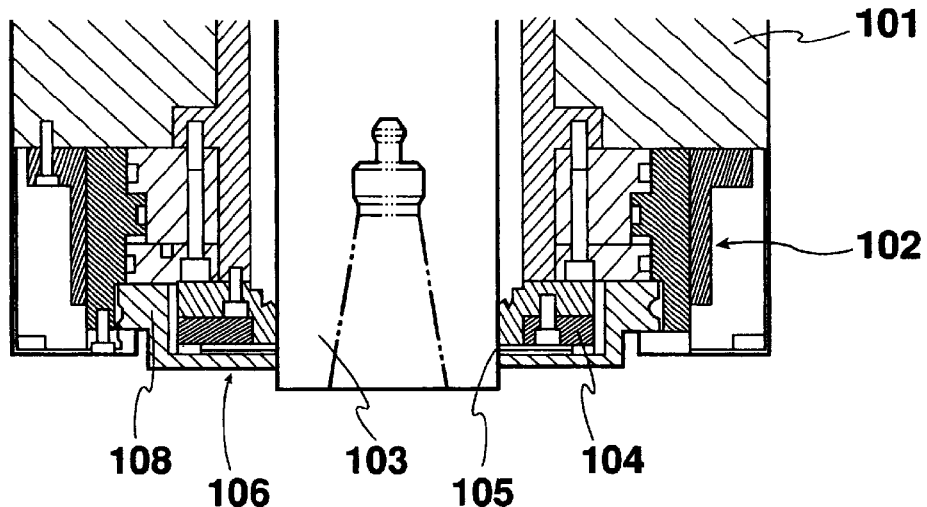
FIG. 1 is an explanatory drawing showing the circumstances of mounting a blind cover in a conventional machine tool.
Figure 2:
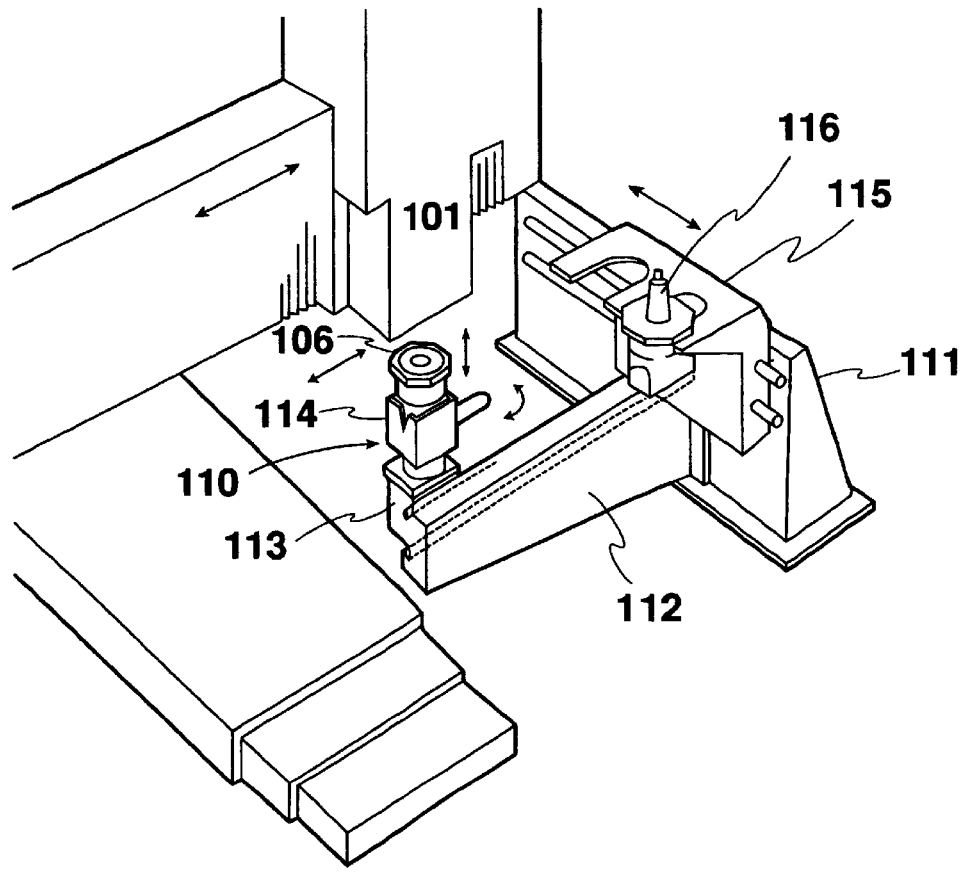
FIG. 2 is a fragmented explanatory view of a machine tool showing a conventional blind cover mounting device.
Figure 3:
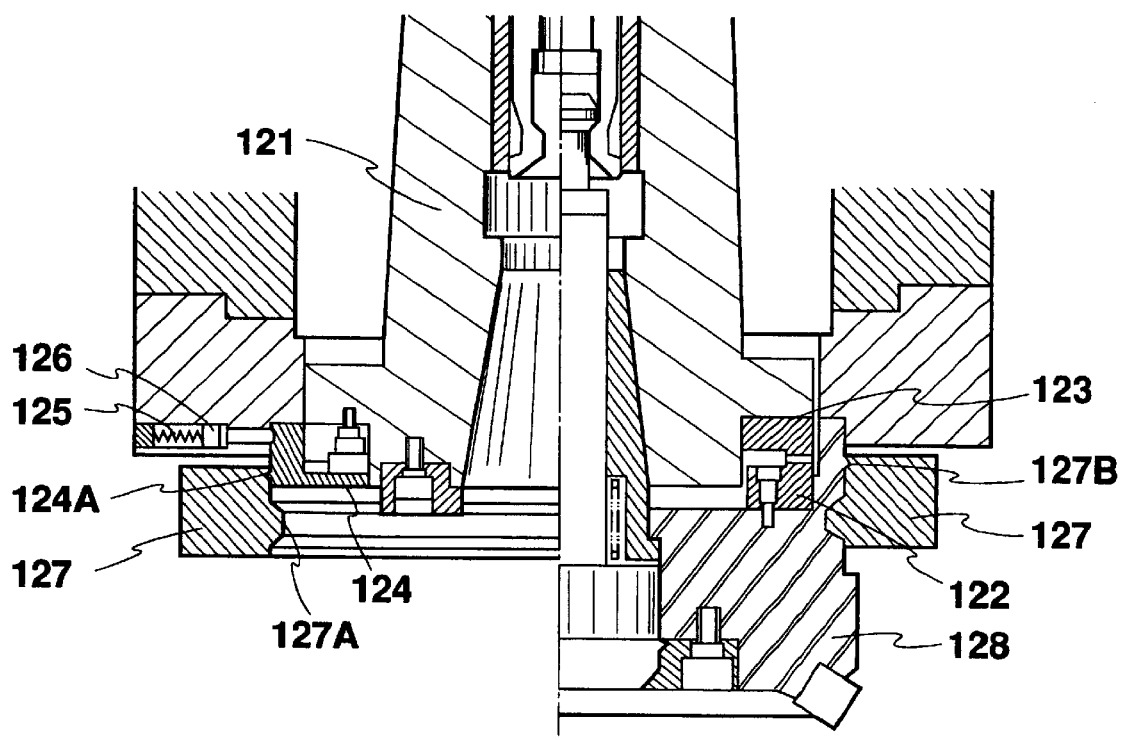
FIG. 3 is an explanatory drawing showing the circumstances of mounting a blind cover in a conventional machine tool.
Figure 4:
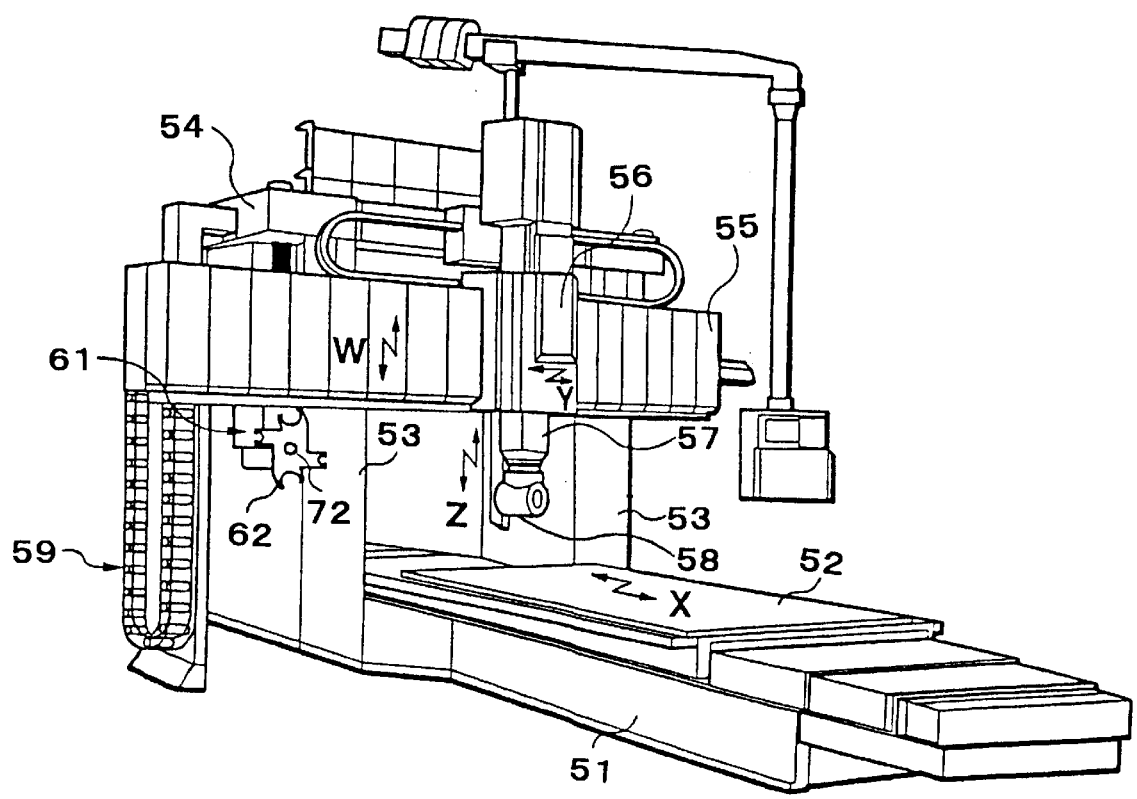
FIG. 4 is an overall pictorial view of a machine tool provided with a blind cover mounting device according to the present embodiment.

In a machining center (a machine tool) shown in FIG. 4, a table 52 is put on a bed 51 installed on a floor so as to be moved and positioned in the X-axis direction (right and left). Columns 53 stand on the floor at both sides of the bed 51. A top beam 54 is fixed to the tops of the columns 53. The columns 53 are provided with guideways in the W-axis direction (vertical) at the front face. A cross rail 55 is attached to the W-axis guideways so as to be moved and positioned. The cross rail 55 is provided with guideways in the Y-axis direction (back and forth) at its front surfaces. A spindle head 56 is attached to the Y-axis guideways so as to be moved and positioned. A spindle head ram 57 is provided in the spindle head 56 so as to be moved and positioned in the Z-direction (vertical).

A tool magazine 59 is arranged at the back end of the column 53 standing at the rear side of the bed 51. An attachment 58 to be removably mounted to the lower end of the spindle head ram 57, and a tool to be directly mounted to a main spindle are stored in the tool magazine 59. A tool changing arm unit 61 is arranged at the rear side lower part of the cross rail 55. The tool changing arm unit 61 turns in the horizontal plane toward the tool magazine 59 side and the spindle head ram 57 side, and can also move an arm swivelling axis 72 in the horizontal and vertical directions by swivelling and horizontal straight movement. The tool changing arm unit 61 is provided with a twin arm shaped tool changing arm 62 which is point-symmetrically provided with tool grippers A1, A2 having different gripping diameters, and attachment grippers B1, B2 (see FIG. 5). The grippers A1, A2 are the grippers to be used when ordinary tools are changed, and can steadily grip the tools by being engaged with V-shaped grooves formed on the tools. The gripper B1 is the gripper to be used when the attachment 58 is changed and carried, and the gripper B2 is the gripper to be used when the attachment 58 is indexed by swivelling at the position of the spindle head 56. These grippers B1, B2 also steadily grip the attachment 58 by being engaged with a V-shaped grooves formed on the attachment 58. In this embodiment of the present invention, a combined tool changing arm 62 having four grippers is shown as an example.

Auxiliary fingers capable of opening and closing, not shown in the figure, are provided at the tip of the respective grippers for preventing dropping of the gripped tools and attachments. Locking pawls 63 are provided respectively on the pair of tool changing grippers A1, A2 and the attachment changing gripper B1 for preventing positional shifts of the tools and attachment 58 during carrying. On the other hand, the attachment indexing gripper B2 is not provided with a locking pawl because the attachment 58 should be turned as a whole in the gripper B2. The auxiliary fingers are constructed so as not to grip the attachment 58 too tightly in order to allow its free rotation when the attachment 58 is gripped. The combined tool changing arm 62 can be indexed by swivelling about the arm swivelling spindle 72 by control machinery such as an NC system, and can also be moved and positioned in the direction of the arm swivelling spindle 72. In this embodiment of the present invention, gripping and carrying of a blind cover carrier with a blind cover put on, to be described later, are carried out by the attachment changing gripper B1.

Figure 5:
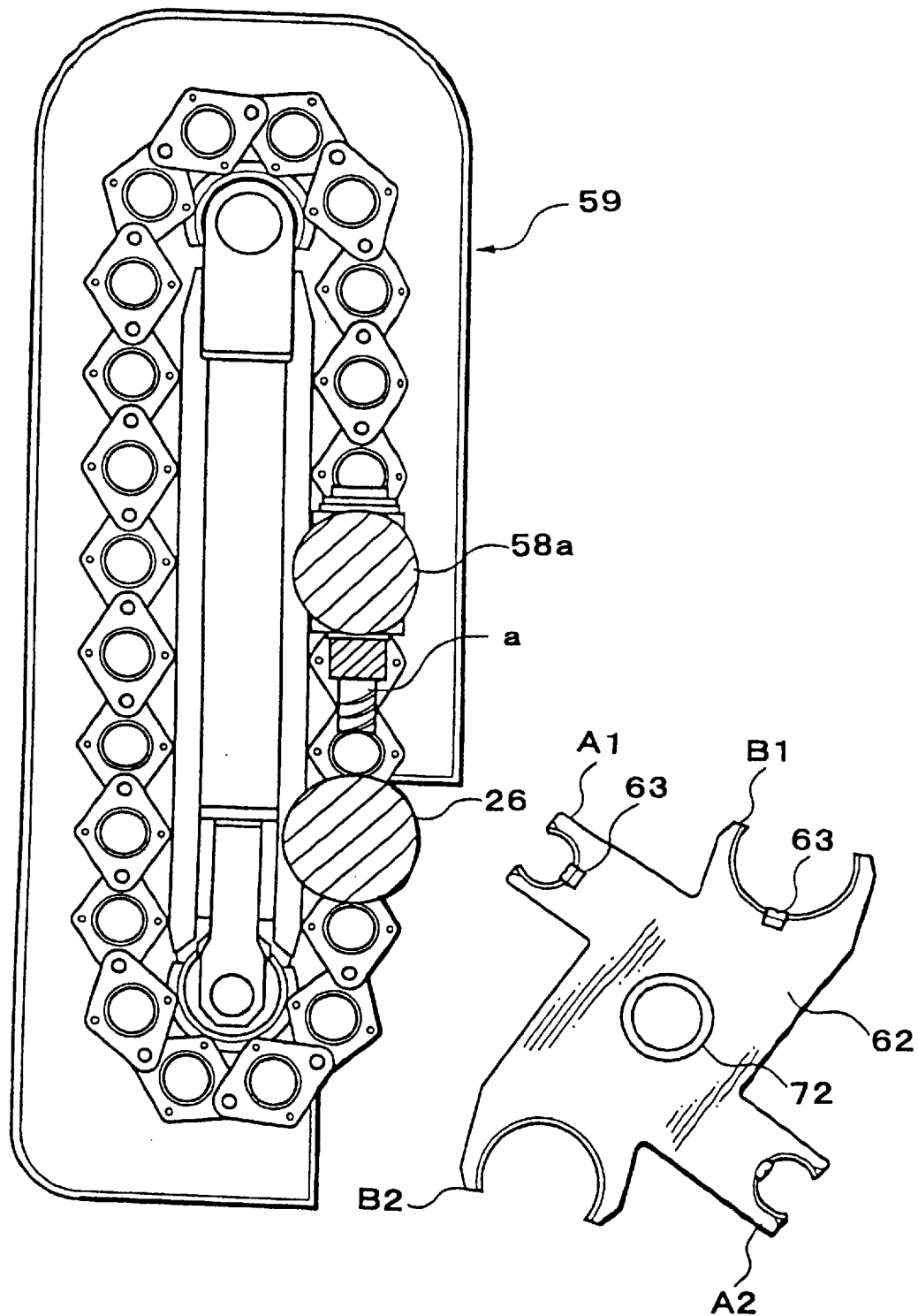
FIG. 5 is an explanatory drawing showing a tool magazine for storing the blind cover, the tool, the attachment, and the tool changing arm according to the present embodiment.

The combined tool changing arm 62 and the tool magazine 59 are shown in FIG. 5. The attachments 58, which have a shank of the same size as that for ordinary tools and a large size body, are stored mixed with ordinary tools in this tool magazine 59. FIG. 5 shows an example of a case where an attachment 58a holds a tool "aa" and a blind cover carrier 26 (see FIG. 7).

Figure 6:
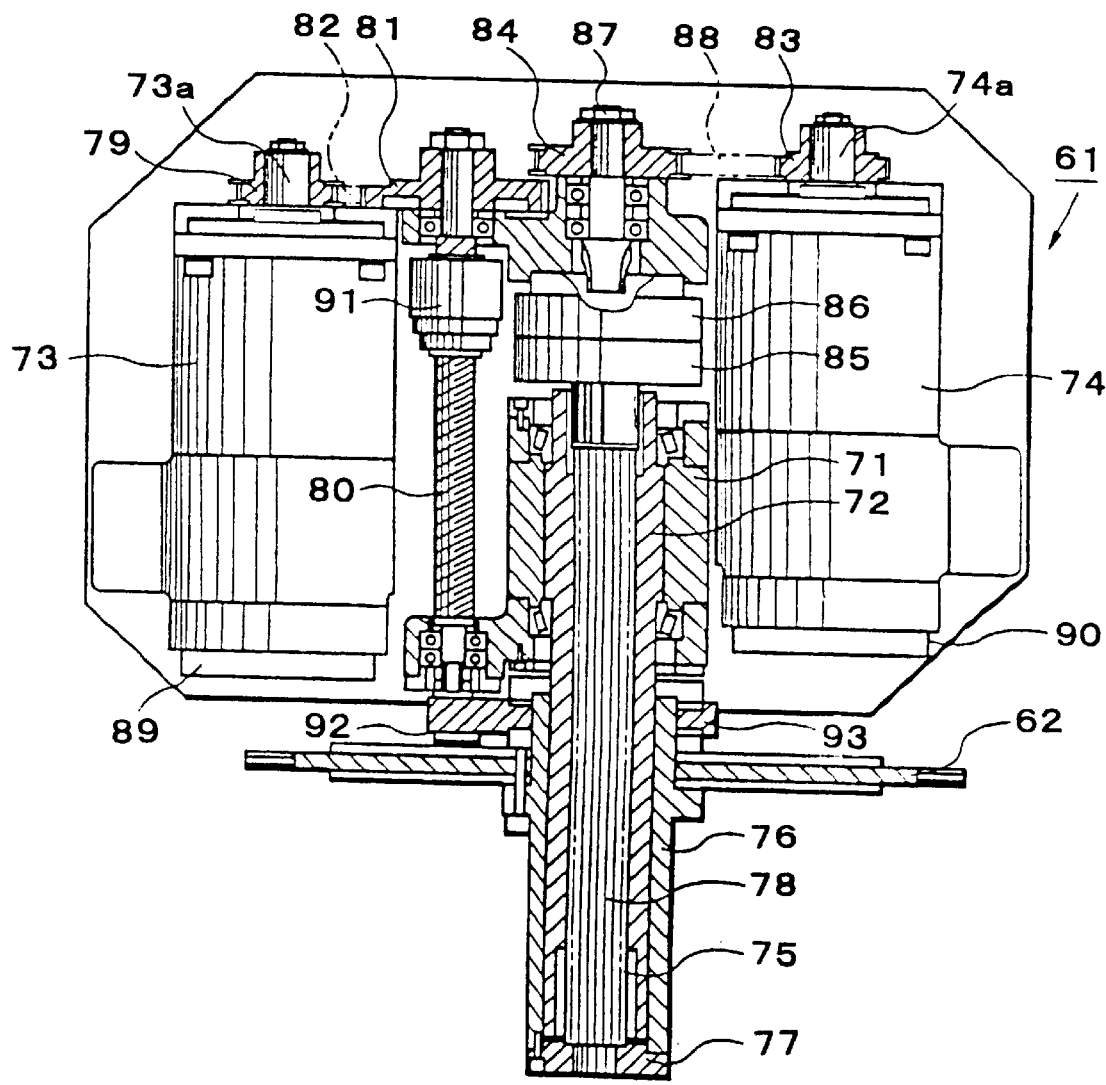
FIG. 6 is a sectional view showing a driving part of the tool changing arm according to the present embodiment.

The tool changing arm unit 61 for changing the attachments 58 and the tools will now be described with reference to FIG. 6. A hollow arm swivelling spindle 72 is rotatably supported by bearings in a unit body 71. The longitudinal lower half of the arm swivelling spindle 72 projects from the unit body 71. A female spline 75 is fitted to the tip of the central hole of the arm swivelling spindle 72. A hollow spindle 76 is fitted on the external surface of the projecting part of the arm swivelling spindle 72 so as to move in the axial direction. The lower tip of a spline shaft 78 is fixed to a cover 77 fixed to the lower tip of the hollow spindle 76. The spline shaft 78 engages with the female spline 75. The combined tool changing arm 62 is fixed to the hollow spindle 76 at the position near the unit body 71. Accordingly, it is possible for the hollow spindle 76 to vertically slide together with the spline shaft 78, and the combined tool changing arm 62 also moves vertically.

A drawing-out and inserting servomotor 73 and a swivelling servomotor 74 which are driven by an NC control unit are fixed to the unit body 71 in parallel to the swivelling spindle 72. A pulley 79 is fitted to an output shaft 73a of the drawing-out and inserting servomotor 73. A pulley 81 is fitted to the tip end of a ball screw 80 arranged in parallel to the output shaft 73a. A synchronizing belt 78 is arranged between the pulleys 79 and 81.

In a similar way, a pulley 83 is fitted to an output shaft 74a of the swivelling servomotor 74. A pulley 84 is fitted to a tip end of an arm drive spindle 87 connected to the arm swivelling spindle 72 via a coupling 86 and a reducer 85 for reducing the rotational speed of the spline shaft 78. A synchronizing belt 88 is arranged between the pulleys 83 and 84. An angle sensor 89 for detecting an axial position is mounted on the drawing-out and inserting servomotor 73, and an angle sensor 90 for detecting a swivelling angle is mounted on the swivelling servomotor 74.

A ball nut 91 engages with the ball screw 80 to be rotated by the drawing-out and inserting servomotor 73. An upper end of a drawing-out and inserting guide rod 92, supported by the unit body 71 so as to move axially, is fixed to the ball nut 91 via connecting fittings not shown in the figure. A lower end of the drawing-out and inserting guide rod 92 is fixed to a drawing-out and inserting bracket 93 engaged with an outer periphery of the hollow spindle 76.

Figure 7:
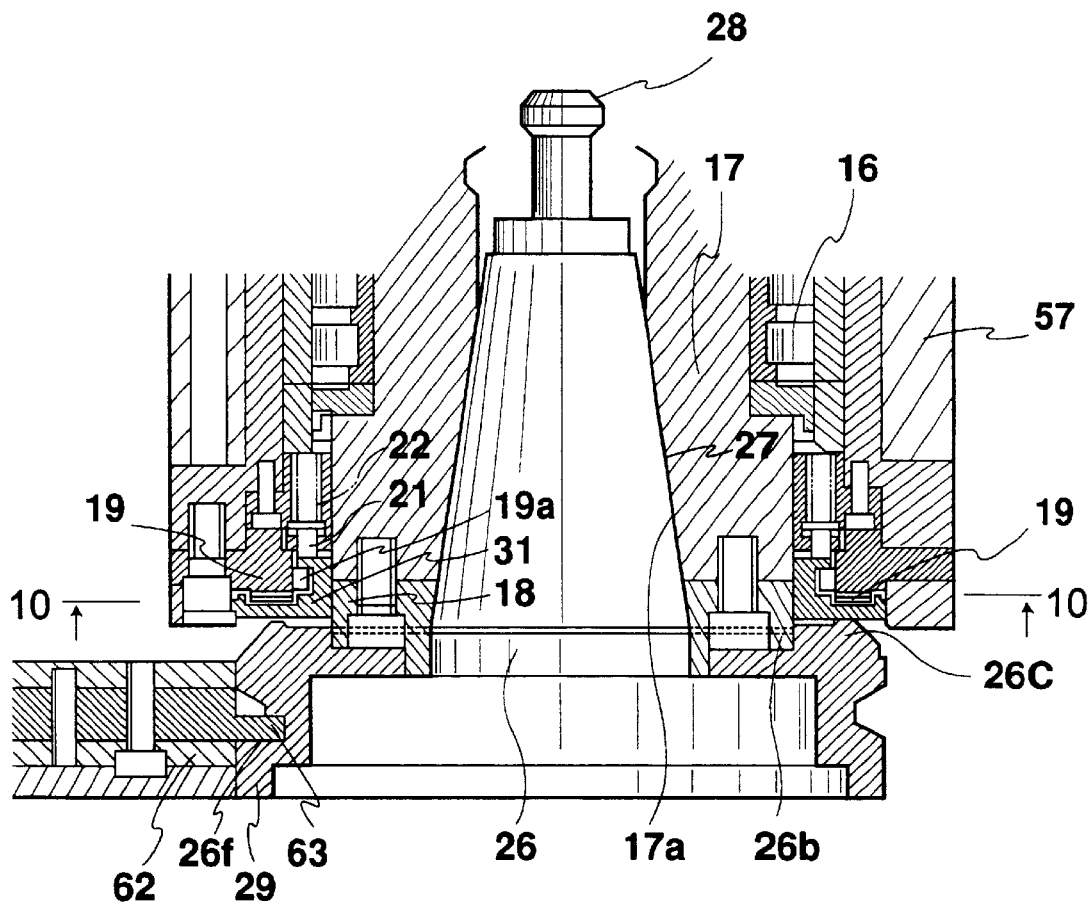
FIG. 7 is an explanatory drawing showing the circumstances of the blind cover carrier mounted on a main spindle.
Figure 8:
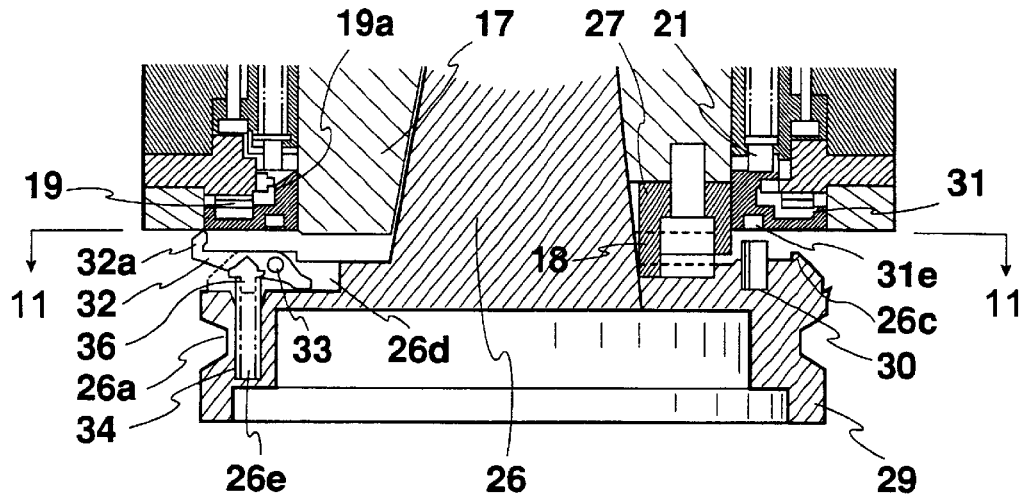
FIG. 8 is a longitudinal sectional view showing the circumstances of a main spindle after the blind cover carrier has been removed from the main spindle leaving the blind cover.

The mounting position of a blind cover at the lower end of the spindle head ram 57 will now be described with reference to FIGS. 7 and 8. The main spindle 17 is rotatably supported by a bearing 16 at a center of the spindle head ram 57. The main spindle 17 can be controlled by an NC system, not shown in the figure, so as to be rotated and indexed. The main spindle 17 is provided with a taper hole 17a at its lower end. The taper hole 17a is fitted with taper shanks of a tool and an attachment 58. A tool clamping device including a known coned disk spring, a known pull-stud, and a known collet, not shown in the figure, is installed in the main spindle 17. Two keys 18 for preventing rotation of the tool and the attachment 58 are symmetrically attached to the lower end face of the main spindle 17.

Figure 10:
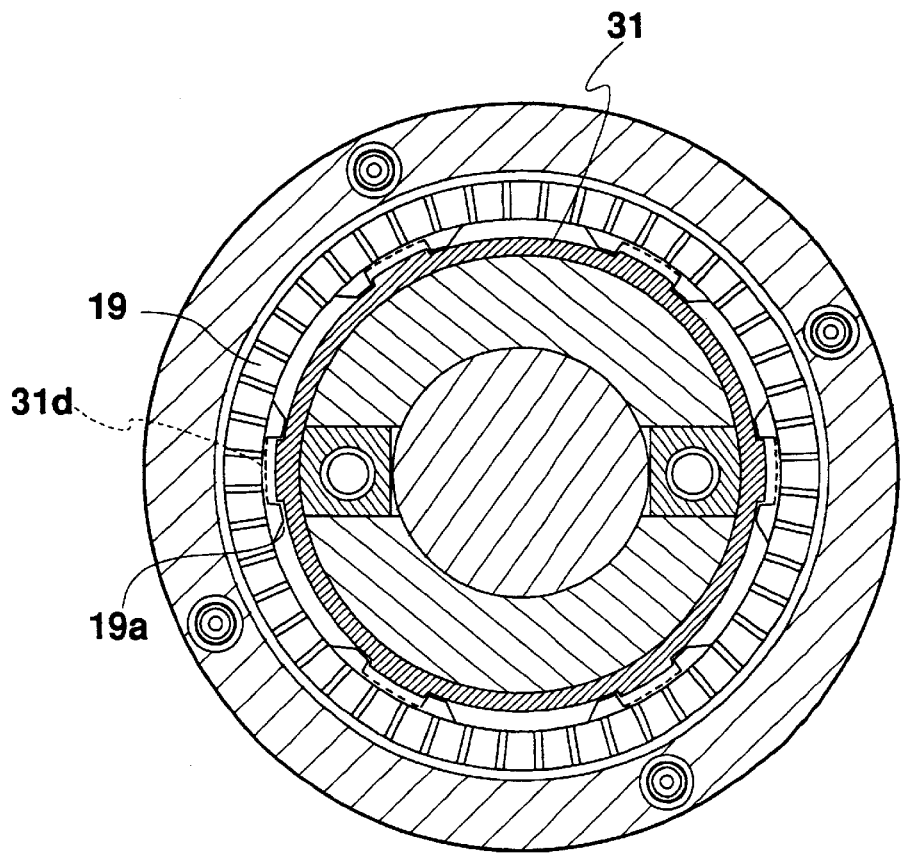
FIG. 10 is a cross sectional view along arrow A—A of FIG. 7.

A ring shaped toothed clutch fixing mechanism (coupling) 19 for indexing the attachment 58 is fixed to the lower end face of the spindle head ram 57 concentrically with the main spindle 17. A plurality of engaging pawls 19a having a parallel shape are formed in the inner periphery of this coupling 19 as shown in FIG. 10. In this embodiment, the engaging pawls 19a are formed at six equally divided positions.

The present invention relates to an automatic mounting and dismounting method of a blind cover for protecting the coupling part from cutting fluid and chips. Push pins 21 are provided in parallel with the axis of the main spindle 17 at equally divided positions inside the coupling 19 so as to hold a blind cover 31, to be described later, at the mounting position of the blind cover 31. The push pins 21 are arranged on the spindle head ram 57 so as to always project downwards forcedly by springs 22.

Figure 11:
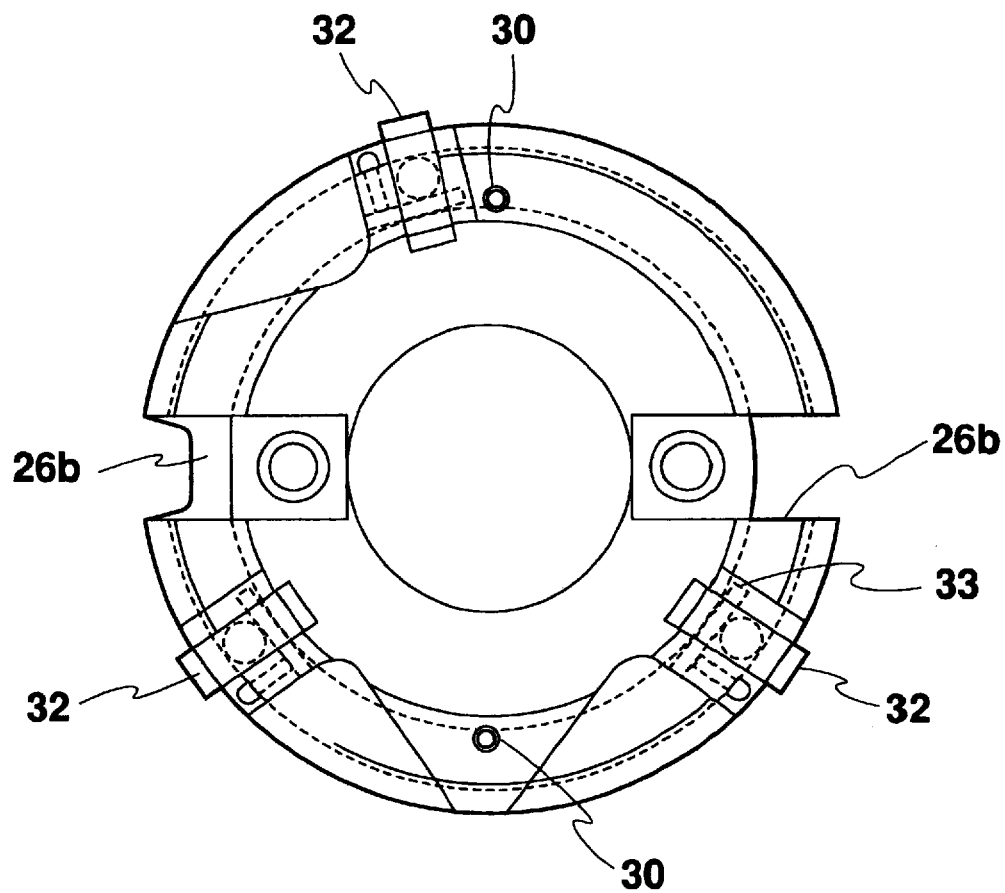
FIG. 11 is a cross sectional view along arrow B—B of FIG. 8.

Next, a blind cover carrier will now be described with reference to FIGS. 8, 9, and 11. The blind cover carrier 26 is provided with a pull stud 28 and a taper shank 27 which can be fitted to a taper hole 60a of a pot 60 connected with a chain of the tool magazine 59 and the taper hole 17a of the main spindle 17. A gripping groove 26a which can be gripped by the attachment grippers B1, B2 of the tool changing arm 62 is formed on the outer periphery of a flange 29 continued to a large diameter side of the taper shank 27. Keyways 26b, which can engage with the keys 18 of the main spindle 17 and keys 60b of the pot 60 of the tool magazine 59, are formed on a shank side end face of the flange 29. Positioning of the blind cover carrier 26 is executed by the keyways 26b. Grooves 26f, into which a locking pawl 63 formed on the gripper B1 of the tool changing arm 62 should be fitted, are formed in the keyways 26b. A placement surface 26c is formed on the shank side of the flange 29 for putting on the blind cover 31. This placement surface 26c has an inverse V-shaped section annularly projecting upwards. Pins 30 for determining the relative angular position between the blind cover 31 and the blind cover carrier 26 are projectingly arranged inside the inverse V-shaped annular projection in parallel with the axis of the blind cover carrier 26. In addition, holding pawls 32 for holding the blind cover 31 are formed on the shank side end face of the flange 29. The holding pawls 32 are formed in three equally spaced radial grooves 26d. The holding pawls 32 are swivelably supported by pins 33 arranged in parallel with the end face of the flange 29.

A key 32a to be engaged with the outer conical surface of the flange 31b of the blind cover 31 is formed at the outer tip of the holding pawl 32. In addition, a stopper to abut against the bottom of the groove 26d is formed at the lower face of the inner tip end of the holding pawl 32. The holding pawl 32 is always enforced in the engaging direction by a lifting pin 36 which is forced in the projecting direction by a spring 34 inserted into a blind hole 26e drilled in the flange 29 in the axial direction.

Figure 12A:
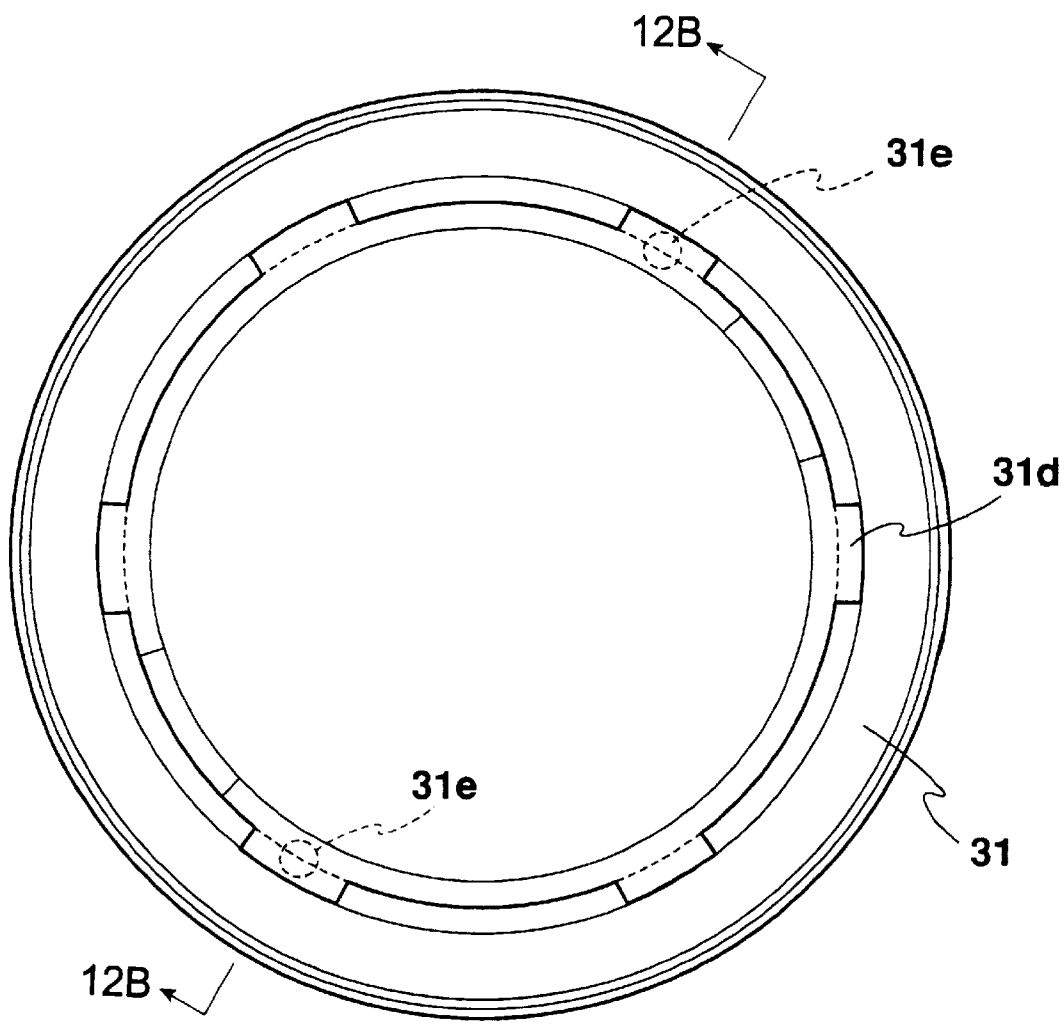
FIG. 12A is a plan view of the blind cover of the present embodiment.
Figure 12B:
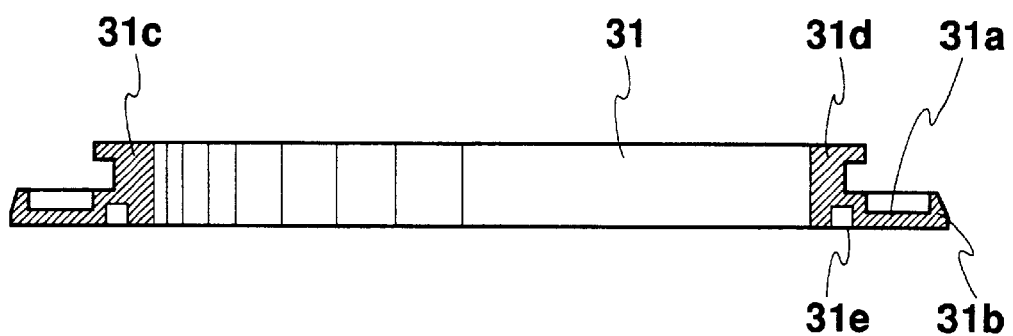
FIG. 12B is a cross sectional view along arrow C—C of FIG. 12A.

As shown in FIGS. 12A and 12B, the blind cover 31 is provided with a recess 31a for protecting a connecting toothed surface of the coupling 19 of the spindle head 57. A flange 31b, which engages with the key 32a of the holding pawl 32, is formed at the outer rim of the blind cover 31. This flange 31b has a conical surface on its outer periphery. In addition, engaging pawls 31d, which engage with engaging pawls 19a of the coupling 19, are formed at the inner cylindrical part 31c of the recess 31a. The engaging pawls 31d are formed at six equally spaced positions of the outer periphery of the inner cylindrical part 31c.

Valley portions having the same width are formed between the engaging pawls 31d. Two holes 31e, into which the pins 30 are inserted for setting the angular position of the engaging pawls 31d, are provided at the lower end face of the inner cylindrical part 31c. When the blind cover 31 has been attached to the lower end of the spindle head ram 57, the inner cylindrical part 31c engages with the outer periphery of the main spindle 17 with a minute clearance. The outer periphery of the flange 31b engages with the inside surface of the spindle head ram 57.

Operation of the present invention constituted as above will now be described with reference to the accompanying drawings. When the machining by the attachment 58 mounted to the spindle head ram 57 has been finished, the tool changing arm 62 puts the attachment 58 into the pot 60 of the tool magazine 59. The designated position of the pot 60 of the tool magazine 59 corresponding to the attachment 58 and the blind cover carrier 26 is stored in a control part of an NC system not shown in the figure, or code numbers are given to the attachment 58 and the blind cover carrier 26 for reference, in order to store the attachment 58 in the specified pot 60 (see FIG. 9).

Figure 9:
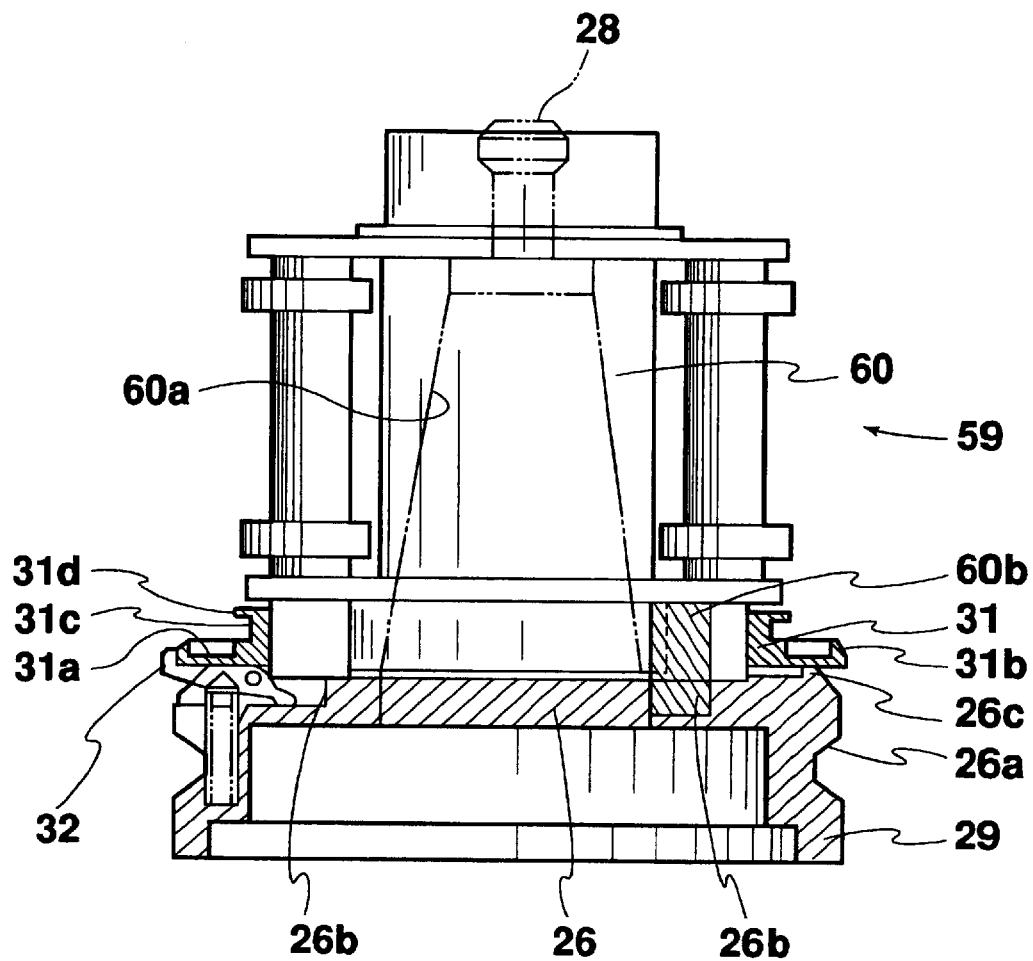
FIG. 9 is an explanatory drawing showing the circumstances of the blind cover carrier stored in the pot of the tool magazine.

As shown in FIG. 9, the blind cover 31 is put on the annular placement surface 26c of the blind cover carrier 26. At this time, the blind cover 31 is put on the blind cover carrier 26 with the recess 31a of the blind cover 31 facing to the shank side, and the pins 30 formed on the blind cover carrier 26 are inserted into the holes 31e of the blind cover 31 (see FIG. 8). Further, the key 32a of the holding pawl 32 engages with the conical part of the flange 31b of the outer rim of the blind cover 31 (see FIGS. 8 and 9). As a result, the blind cover 31 is reliably held by the blind cover carrier 26. In addition, the key 60b of the pot 60 of the tool magazine 59 is inserted into the keyway 26b of the blind cover carrier 26 for determining the relative angular position of the pot 60 with respect to the blind cover carrier 26.

According to an NC command for mounting the blind cover 31, the spindle head ram 57 is positioned at the tool changing position, and the tool magazine 59 indexes and positions the blind cover carrier 26 at the tool changing position. The tool changing arm unit 61 is positioned on the tool magazine 59 side. The gripper B1 of the tool changing arm 62 grips the gripping groove 26a according to a command of the NC system. At the same time, the locking pawl 63 is fitted into the groove 26f. After that, the tool changing arm 62 moves toward the axis of the main spindle 17, and draws out the blind cover carrier 26, and moves toward the spindle head 56 side for positioning.

Next, the tool changing arm 62 inserts the shank 27 of the blind cover carrier 26 into the taper hole 17a of the main spindle 17. In this case, the blind cover 31 is automatically aligned through being guided by an inner peripheral surface of the spindle head ram 57 surrounding the coupling 19 and the outer peripheral surface of the main spindle 17. In this inserting process, the keys 18 of the main spindle 17 are fitted into the keyways 26b of the blind cover carrier 26. In this case, the key 32a of the holding pawl 32 abuts on the lower end face of the spindle head ram 57, and is pushed down against the enforcing force of the spring 34 for releasing the grip of the blind cover 31. In this state, the mounting operation of the blind cover 31 is continued. Because the blind cover 31 is held by the blind cover carrier 26 with the engaging pawls 31d shifted by a 1/12 rotation with respect to the engaging pawls 19a of the coupling 19, the blind cover 31 can pass through the space between the engaging pawls 19a, even when most of the shank 27 of the blind cover carrier 26 has been inserted into the taper hole 17a of the main spindle 17. The engaging pawl 31d pushes the push pin 21 against the spring force of the spring 22, and the recess 31a of the blind cover 31 completely covers the toothed part of the coupling 19.

The blind cover carrier 26 finishes the mounting operation of the blind cover 31 by pulling up the pull stud 28 of the blind cover carrier 26 using a tool pulling-up device not shown in the figure. At this time, the tool changing arm unit 61 moves, and the tool changing arm 62 separates from the blind cover carrier 26. Then, the blind cover carrier 26 is gripped by the gripper B2 of the tool changing arm 62.

Further, the engaging pawls 19a of the coupling 19 are aligned and engage with the engaging pawls 31d of the blind cover 31 due to a 1/12 rotation of the main spindle 17 (see FIG. 10). In this state, the push pins 21 push the engaging pawls 31d of the blind cover 31 by the spring force of the springs 22 so as to come in contact with the engaging pawls 19a of the coupling 19. Consequently, the blind cover 31 does not shift or come off even if the external force such as vibrations is applied.

When the mounting of the blind cover 31 has finished, the tool changing arm unit 61 moves, and the tool changing arm 62 grips the blind cover carrier 26. The gripping of the pull stud 28 is released by the advance (descent) of a draw bar of the tool pulling-up device, not shown in the figure, by a finishing signal of the blind cover mounting operation, and at the same time, the fitting of the taper hole 17a and the shank 27 is released by the shock of abutting of the tip of the draw bar against the pull stud 28. After that, the tool changing arm 62 stores the blind cover carrier 26 in the pot 60 of the tool magazine 59 in the same way as ordinary tool changing operations.

In the case of dismounting the blind cover 31, the tool changing arm unit 61 moves the blind cover carrier 26, and fixes it to the main spindle 17 by the tool changing operations. In this case, the key 32a of the holding pawl 32 abuts against the lower end face of the spindle head ram 57, and is pushed down against the enforcing force of the spring 34 making the holding pawl 32 open. Following this, the pin 30 engages with the pin hole 31e of the blind cover 31. After that, the main spindle 17 rotates by a 1/12 rotation. Because only the main spindle 17 rotates by a 1/12 rotation with the blind cover 31 locked by the pin 30, the engaging pawl 31d of the blind cover 31 shifts from the engaging pawl 19a of the coupling 19 to the valley portion, and both pawls do not interfere with each other. The blind cover 31 is pushed down by the push pin 21 and falls down to the placement surface 26c of the blind cover carrier 26 being guided by the pin 30. When the shank 27 of the blind cover carrier 26 has been drawn out from the taper hole 17a of the main spindle 17 in this state, the holding pawl 32 is pushed up by the enforcing force of the spring 34 and closed. As a result, the key 32a of the holding pawl 32 engages with the conical surface of the flange 31b of the outer rim of the blind cover 31. The blind cover carrier 26 is completely drawn out from the main spindle 17 by the movement of the tool changing arm unit 61, and stored in the specified position of the tool magazine 59.

As mentioned above, according to the structure of the present embodiment, the changing of the blind cover 31 is performed using the tool changing arm 62 which is used for changing the tool and the attachment 58. Therefore, the blind cover 31 can be mounted and dismounted by the same operation as ordinary tool changing operations. Because the blind cover 31 can be stored in the tool magazine 59 as well as the tool and the attachment 58, a changing arm, a positioning device, and storing equipment specialized for the blind cover 31 are not necessary. As a result, miniaturization of machine tools and reduction of cost can be achieved.

What is claimed is:

1. A method for mounting and dismounting a blind cover for protecting a fixing mechanism of a machine tool which is provided with the fixing mechanism for supplying an attachment, which is capable of mounting and dismounting a tool, to a spindle head and for positioning and fixing the attachment by a swivel indexing mechanism, comprising the steps of:

supplying the blind cover for covering an exposed part of the fixing mechanism with a changing arm capable of carrying and changing a tool and an attachment when the fixing mechanism is not used; and fixing the blind cover to the spindle head after adjusting the relative position between the blind cover and the fixing mechanism using the swivel indexing mechanism.

2. A method according to claim 1, whereby the fixing step of the blind cover is characterized by engaging the blind cover with the fixing mechanism by turning engaging pawls formed on both of the fixing mechanism and the blind cover.

3. A machine tool capable of mounting a tool on a main spindle and fixing an attachment, which is capable of mounting and dismounting a tool, to a spindle head, comprising:

a blind cover which is attached to an exposed part of a fixing mechanism for positioning and fixing the attachment in order to protect the exposed part;

a carrier which holds the blind cover and reciprocates between a containing position and a mounting position of the blind cover; and a tool changing arm which selectively grips the carrier, the tool, and the attachment and reciprocates between the containing position and the mounting position.

4. A machine tool according to claim 3, wherein the fixing mechanism is provided with a plurality of engaging pawls;

the blind cover is provided with a plurality of engaging pawls; and the engaging pawls of the fixing mechanism are engaged with the engaging pawls of the blind cover by turning the fixing mechanism.

5. A machine tool according to claim 4, comprising:

an enforcing means which maintains the engagement of the engaging pawls of the fixing mechanism and the engaging pawls of the blind cover when both of the engaging pawls engage with each other, and also ejects the blind cover from the mounting position when the engagement is released.

6. A machine tool according to claim 3, wherein the carrier, the tool, and the attachment have the same size taper shank, and are contained in the same tool magazine.

7. A machine tool according to claim 3, wherein the carrier comprises a gripping groove to be gripped by the tool changing arm, and a flange on which keyways are cut for inserting keys for adjusting the relative angular position between the carrier and the main spindle.

8. A machine tool according to claim 7, wherein the flange further comprises:

a positioning member for determining the putting position of the blind cover; and an openable holding mechanism for holding the blind cover.

* * * * *